United States Patent [19]
Haldimann et al.

[11] 3,982,639
[45] Sept. 28, 1976

[54] SHELF STORAGE SYSTEM

[75] Inventors: Hans Rudolf Haldimann, Zurich;
Max Buehler, Thalwil; Patrick R. Brown, Zumikon, all of Switzerland

[73] Assignee: Weelpal, A.G., Zug, Switzerland

[22] Filed: Sept. 3, 1974

[21] Appl. No.: 502,841

[30] Foreign Application Priority Data
Sept. 6, 1973 Switzerland.................... 13042/73

[52] U.S. Cl..................... 214/16.4 C; 214/16.4 A
[51] Int. Cl.²............................................ B65G 1/06
[58] Field of Search............... 214/16.4 A, 16.1 CE, 214/16.4 C

[56] References Cited
UNITED STATES PATENTS

| | | | |
|---|---|---|---|
| 548,090 | 10/1895 | Puffer............................ | 214/16.4 A |
| 2,095,151 | 10/1937 | O'Connor et al............ | 214/16.1 CE |
| 3,079,015 | 2/1963 | Sinclair et al................ | 214/16.1 CE |
| 3,434,604 | 3/1969 | Haldimann et al........... | 214/16.4 A |
| 3,738,506 | 6/1973 | Cornford et al.............. | 214/16.4 A |

Primary Examiner—L. J. Paperner
Assistant Examiner—R. B. Johnson
Attorney, Agent, or Firm—Abraham A. Saffitz

[57] ABSTRACT

A shelf storage system comprises a plurality of shelves on which are supported a plurality of mobile storage and transport units. Each unit comprises a first part consisting of a four sided frame in which rollers are housed with their axes of rotation above the frame and a second part which is adapted for carrying the goods to be stored and is detachably supported on the first part. The second part may be any one of a large variety of forms chosen in dependence upon the goods which are to be stored therein.

6 Claims, 10 Drawing Figures

SHELF STORAGE SYSTEM

CROSS REFERENCE TO RELATED APPLICATION

Applicants make reference to the Swiss Patent Application No. 13'042/73, filed on Sept. 6, 1973 under which priority is claimed following the provisions of 35 U.S.C. 119.

BACKGROUND OF THE INVENTION

1. Field of the Invention

The present invention relates to a shelf storage system, in which the goods to be stored are housed on a mobile storage and transport unit in shelves equipped with bars, conveying mechanisms being provided for transport of the goods in the storage system and auxiliary mechanisms for loading and unloading of the shelves and also for the drive, braking, position maintaining, counting and position changing of the storage and transport units.

2. Description of the Prior Art

Known systems of this type generally utilise load bearing members designated as roller bases, which are generally constructed as a latticed grill or wooden plate comprising wheels or rolls disposed in the vicinity of the four corners. The goods to be stored are then deposited on these roller supports and are housed on the shelf together with the base. In many cases, the goods to be stored are delivered onto conventional trays or palettes and, therefore, for the sake of simplicity, the loaded tray or palette is disposed on the roller base and thus stored.

This known method of storage has the advantage that the stored goods can be easily manipulated and can be put into and taken out of storage at relatively low cost. Owing to the mobility of the individual stored units, the provision of conveyor belts or similar transport mechanisms becomes superfluous, merely lifting mechanisms are required, for the loading and unloading of the shelves.

Although this system has given good results, it has some disadvantages. When loaded trays are disposed on the bases, a relatively large amount of space is lost in the upward sense, that is to say approximately 10–25 percent of the available storage area is taken up by the bases and the trays. Furthermore, these roller bases are relatively heavy and expensive, which is a particularly important disadvantage as they are required in large numbers.

There is the further disadvantage that, in most cases, they represent a more or less advantageous compromise in respect of adaptation to the type of goods to be stored, on one hand, and in respect of the mechanical operations taking place in the storage system on the other hand.

OBJECTS OF THE INVENTION

The object of the present invention is to provide an improved shelf storage system of the aforementioned type, which no longer involves the disadvantages indicated above and enables the same storage turnover and same storage capacity to be attained at a considerably more favourable cost.

SUMMARY OF THE INVENTION

According to the present invention, there is provided a storage system comprising:

a rectangular standard formed of vertical members connected to each other by horizontally extending transverse members, a pair of longitudinal trackway member resting on the ends of the transverse members of said stand, the one end of said stand having the trackway members at a higher elevation than at the other end of said stand to form a falling gradient at the receiving end of the shelf of said stand, a stop and position mechanism at the lower end of said trackway members to adapt the storage of pallets loaded with goods on said trackway, a breaking means mounted on said bars to restrain the free rolling of storage end transport pallets, at least one shelf for a mobile storage and transport unit by which goods may be stored on the shelf and including means for loading and unloading the goods on said shelf, a mechanism for loading and unloading the unit on and off the shelf, a mechanism for driving the mobile storage and transport unit, a mechanism for braking the mobile storage and transport unit, a mechanism for maintaining a mobile storage and transport unit in position, and a mechanism for changing the position of the mobile storage and transport unit within the system in which the mobile storage has a first part, comprising a four sided frame supported with two pairs of rotatable supports disposed at opposite sides respectively of the frame and with their axes of rotation disposed above the frame and a second part adapted to be interchangeably supported on the first part and formed to receive the goods to be stored.

In this manner, the storage and transport units can be optionally adapted, on one hand, to the goods to be stored, and on the other, to the technical mechanisms of the system. These technical mechanisms, such as shelves with appropriate bars, loading and unloading mechanisms, transport members, drive members, brakes and the like can be of identical construction for every type of storage system, since they come into contact only with the standardised first part of the mobile storage and transport unit. The load receiving second part, on the other hand, which is adapted to be disposed on the first part, is optionally adapted to the goods which are to be received.

In many cases, this load receiving part can itself be a standardised tray, which is delivered onto the storage system. For this reason, it is advantageous to adapt the shape of the first part to conventional trays in such a manner that the slightest possible degree of additional height and rigidity is required.

BRIEF DESCRIPTION OF THE DRAWINGS

In order that the invention may be more fully understood, several embodiments of the invention will now be described, by way of example, with reference to the accompanying drawings, in which.

DESCRIPTION OF THE PREFERRED EMBODIMENTS

The basic structure of a storage system is already known. Only the parts which are of interest in connection with the present invention are therefore illustrated and described in greater detail below.

Figure 1:
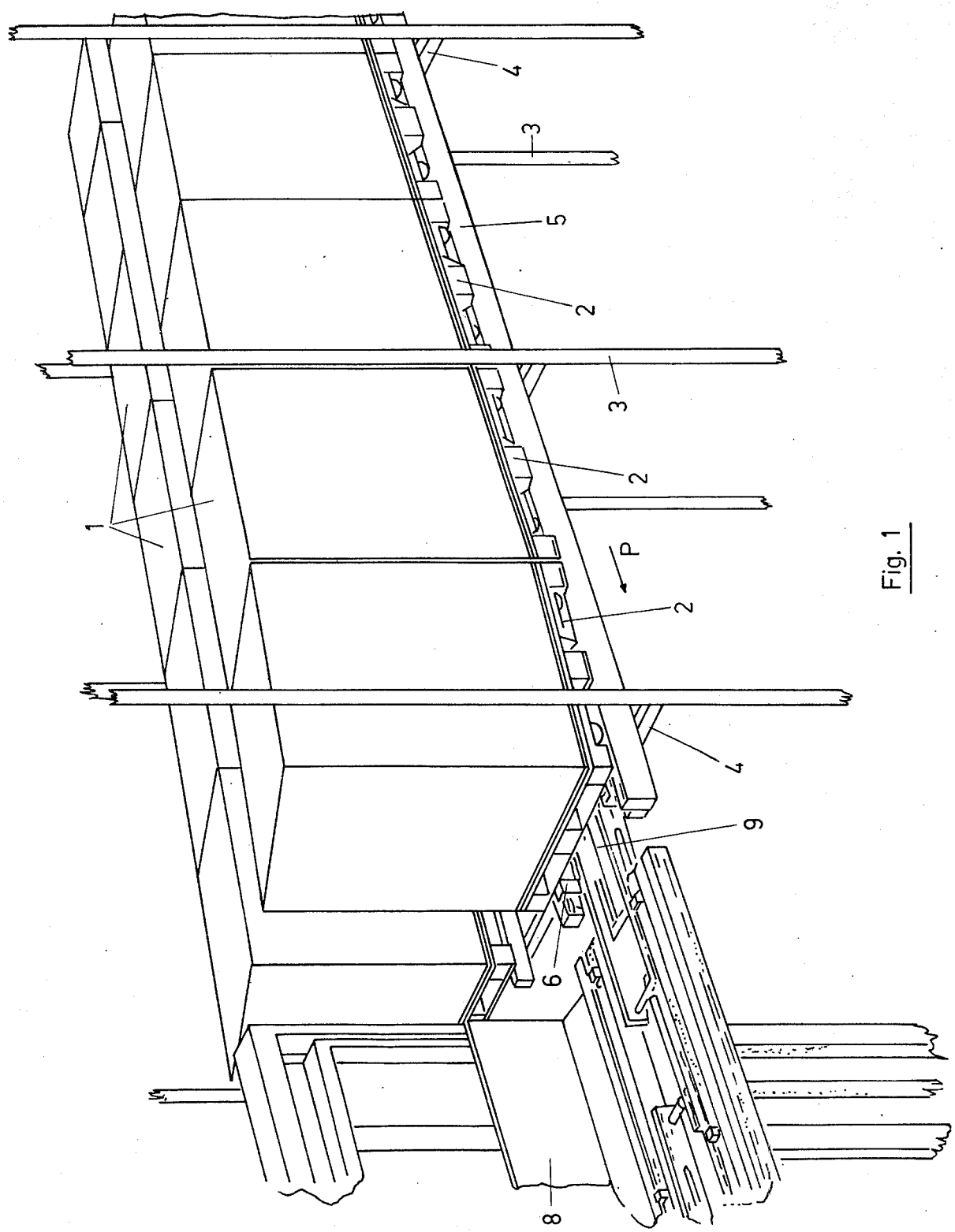
FIG. 1 shows a view of part of a storage system.
Figure 2:
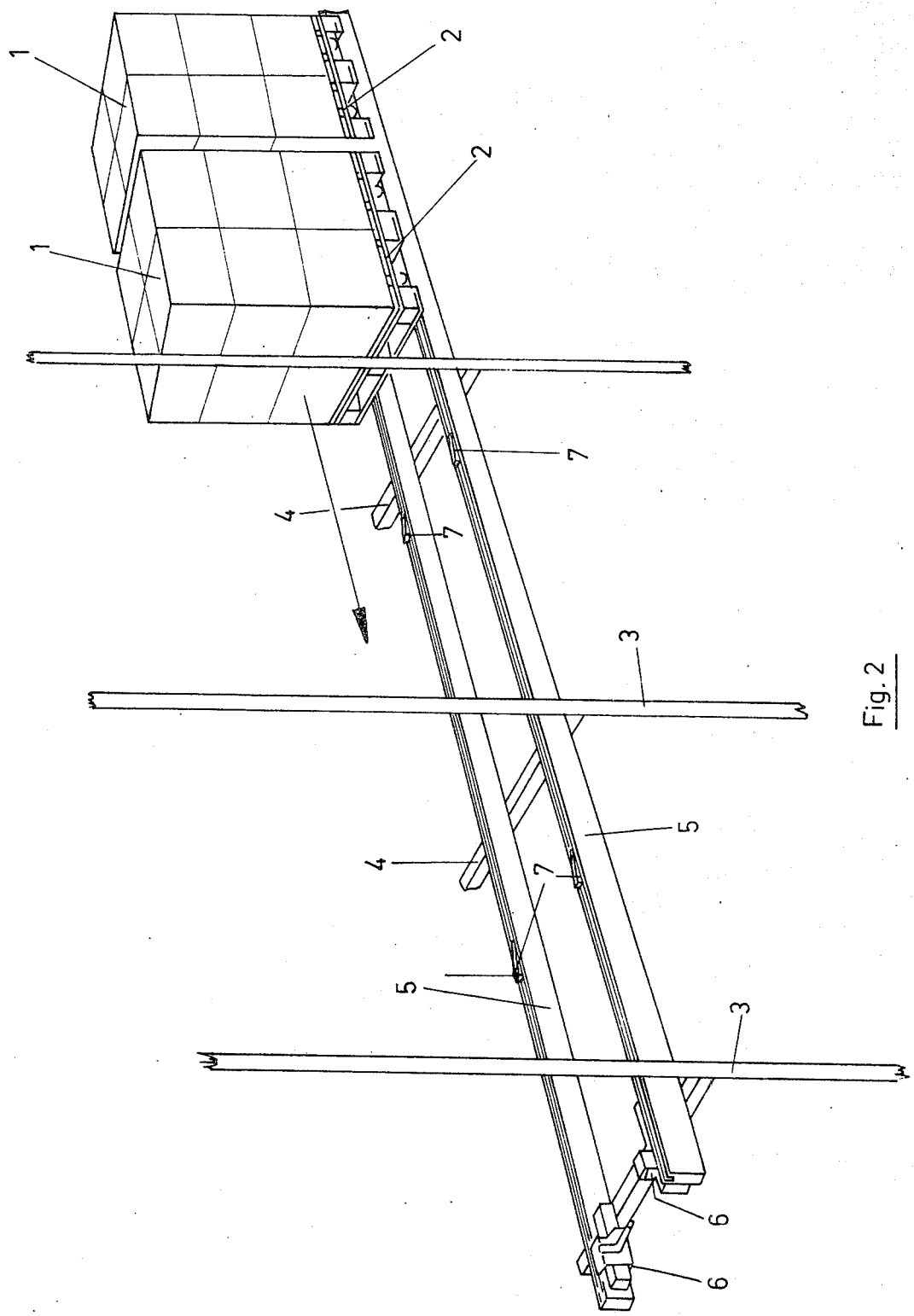
FIG. 2 shows a view of part of a storage shelf, forming part of the storage system of FIG. 1.

A rectangular stand can be seen in FIGS. 1 and 2. This stand accommodates storage and transport units on pallets 2, loaded with the goods 1. The stand comprises a number of vertical members 3, which are connected to each other through horizontally extending transverse members 4. Longitudinal trackway members 5 rest on the transverse members 4. The members 5 are preferably constructed as bars and have a slight falling gradient, relative to the horizontal, in the direction of arrow 2, that is to say from a higher location at the top of FIG. 1 to a lower location at the bottom of the figure and, in the direction of the receiving end of the shelf thus formed. A stop and positioning mechanism 6 is installed on the end of the bars 5, thus preventing the storage and transport units 2 passing over the end of the bar. Brake mechanisms 7 (see FIG. 2), which are mounted in the bars 5, ensure that the speed of the freely rolling storage and transport units 2 does not become too great.

A mobile conveyor vehicle 8 (FIG. 1) is provided in a known manner on the front surface of the shelf. This vehicle 8 is equipped with a transfer mechanism 9 for loading and unloading of the shelves.

Figure 3:
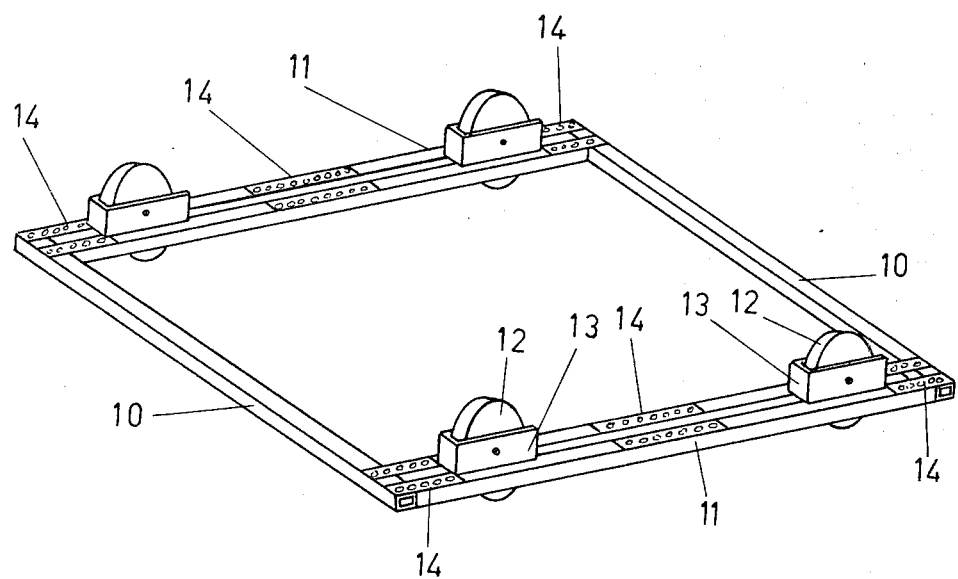
FIG. 3 is a perspective view of a trolley forming part of the storage system of FIG. 1.

In FIG. 3, an embodiment of a trolley which forms the first part of the storage and transport unit of the system is shown. The trolley comprises a frame formed by two cross members 10 and two double longitudinal members 11. The members 10 and 11 may have a rectangular hollow profile and may be of steel or a light metal. Also the longitudinal members 11 may be constructed as a sheet metal pressing. Rollers or wheels 12 are disposed between individual limbs of the double longitudinal members 11. The axis of rotation for the wheels 12 is disposed above the frame at such a height that the lower edge of the members 10 and 11 is disposed at only a small distance; approximately 1–2 cm above the contact surface for the wheels 12. For this reason, wheel casings 13 are provided, which rotatably support the wheels 12 in the frame. These wheel casings may also be of greater height than that shown in the drawings so that they can receive loads on their upper surfaces.

The trolley illustrated in FIG. 3 is equipped with areas of slip-resistant material 14 at six points, and the contact surfaces for a standardised palette or tray forming the second part of the mobile storage and transport unit are located on this cover. If a different tray is utilised, which is longer than the trolley, it is disposed in the centre of the trolley on one side and on the wheel casings which are then constructed so as to be greater in height, on the other side.

Figure 4:
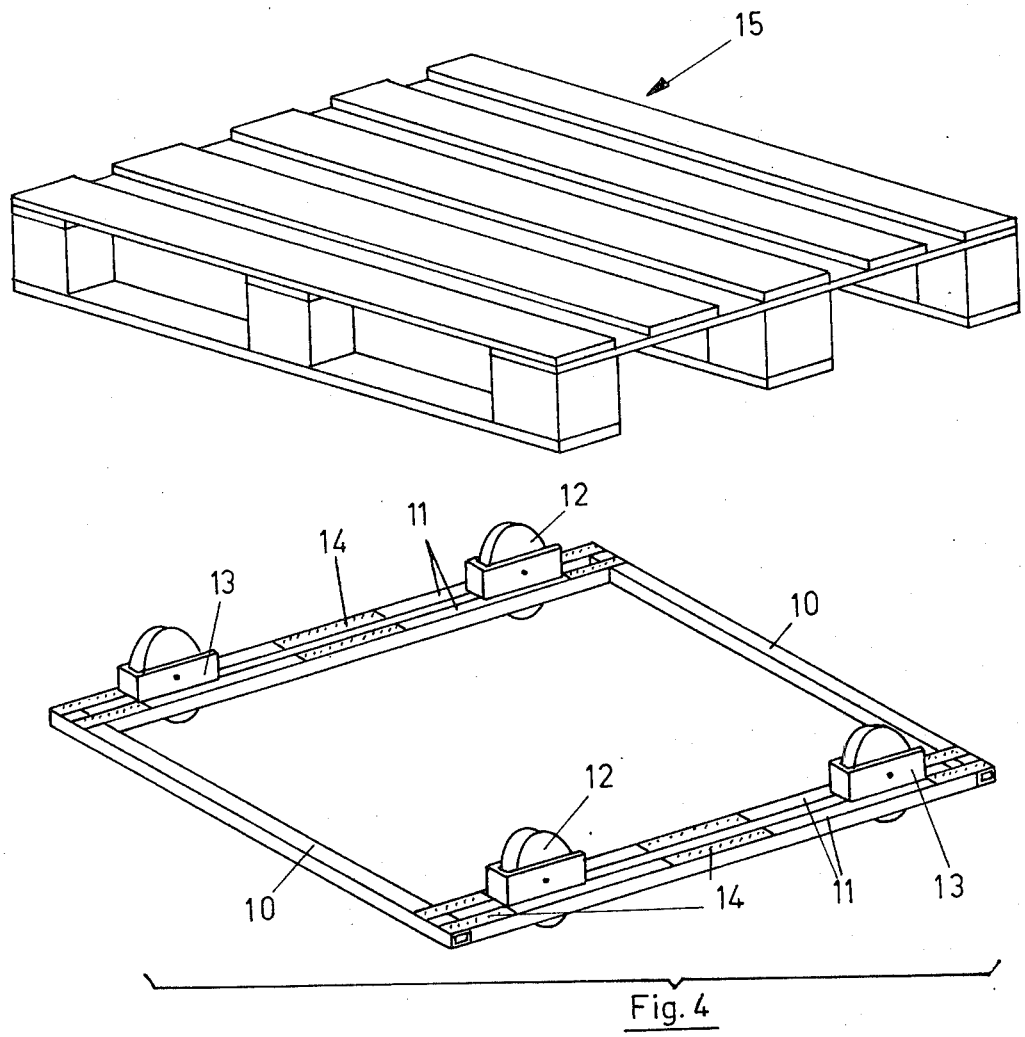
FIG. 4 shows the trolley of FIG. 3 with a load receiving part constructed as a palette.
Figure 5:
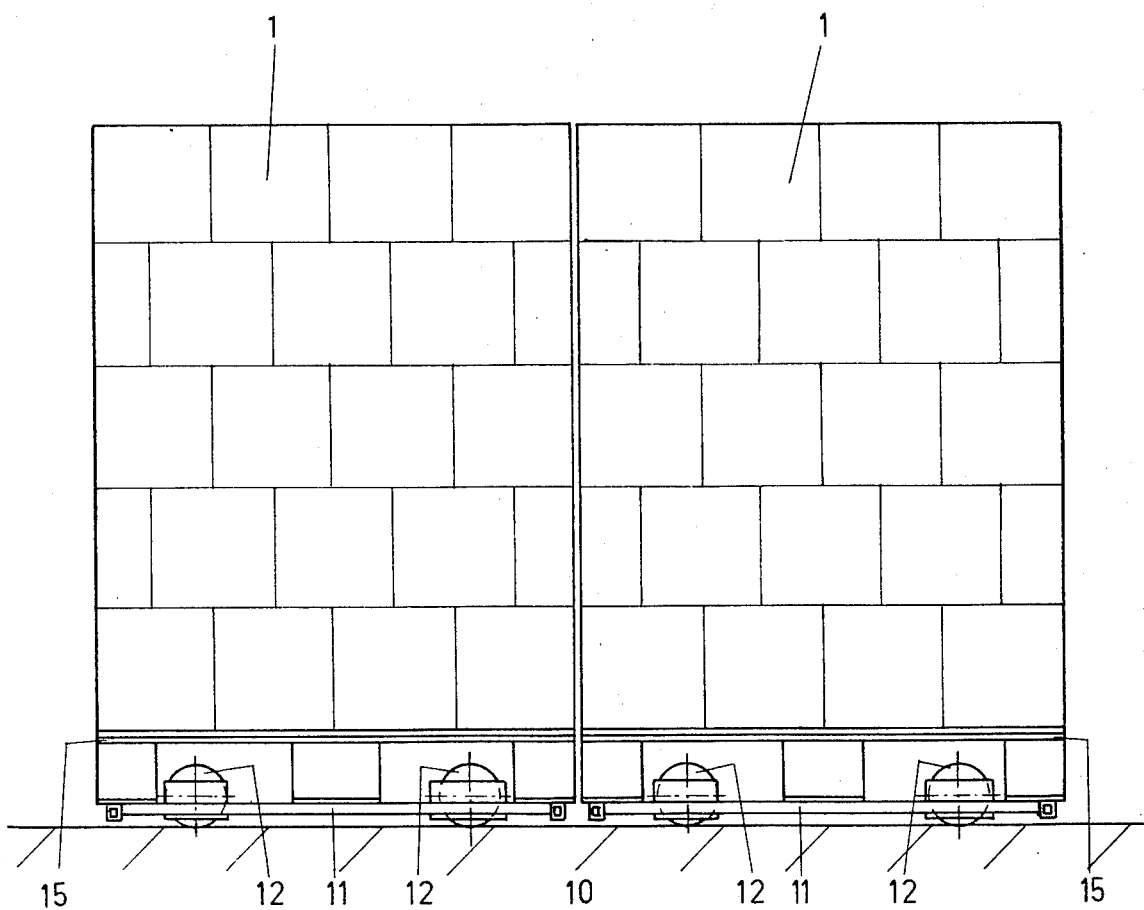
FIG. 5 is a side perspective view of two loaded storage and transport units.

A storage and transport unit is shown in FIG. 4. This comprises a trolley as shown in FIG. 3 and a standardised tray 15, shortly before connection. As can also be seen with particular clarity in FIG. 5, the storage and transport unit thus formed is only of slightly greater vertical depth than the tray 15 alone.

Figure 6:
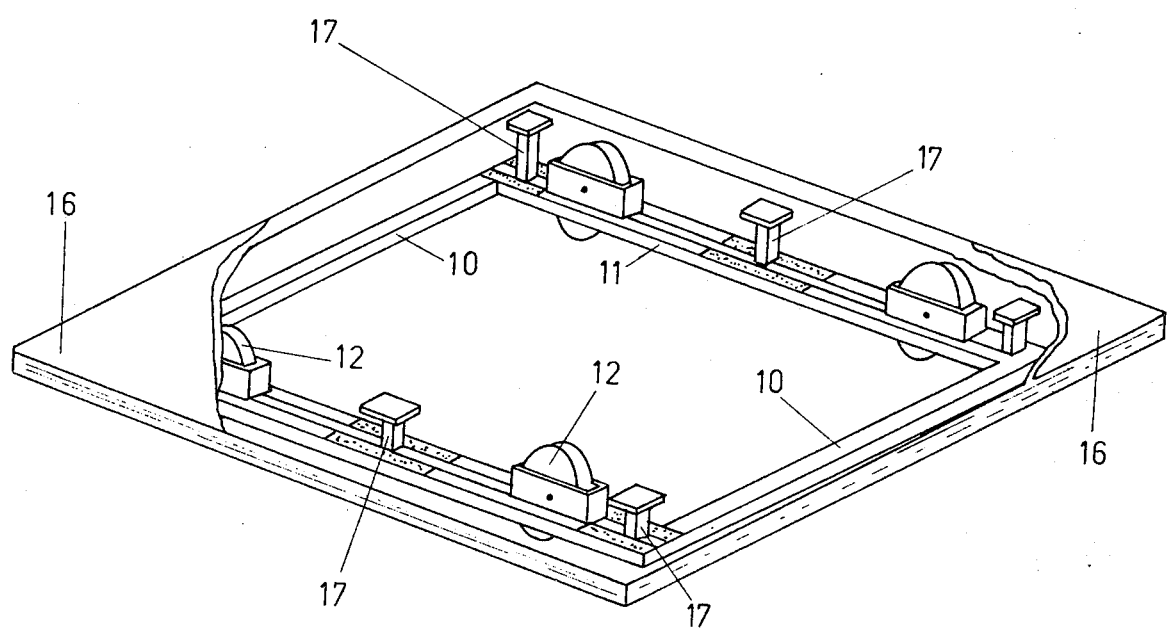
FIG. 6 shows a further storage and transport unit.

FIG. 6 shows a further embodiment of a storage and transport unit. The unit again comprises a trolley as shown in FIG. 3, which is equipped with a load receiving part constructed as a tray 16. The tray 16 comprises six feet 17, which are mounted by means of screws and rest on the frame of the trolley at their free ends. The height of these feet 17 is, of course, so dimensioned that a small amount of free space remains between the lower surface of the tray 16 and the upper surfaces of the wheels 12. This storage and transport unit is particularly suitable for the accommodation of larger articles and again the vertical depth required to accommodate it is small and optional utilisation of the available storage area is thus ensured. The tray 16 can be made of such cheap material that is is supplied with the load and is regarded as disposable.

Figure 7:
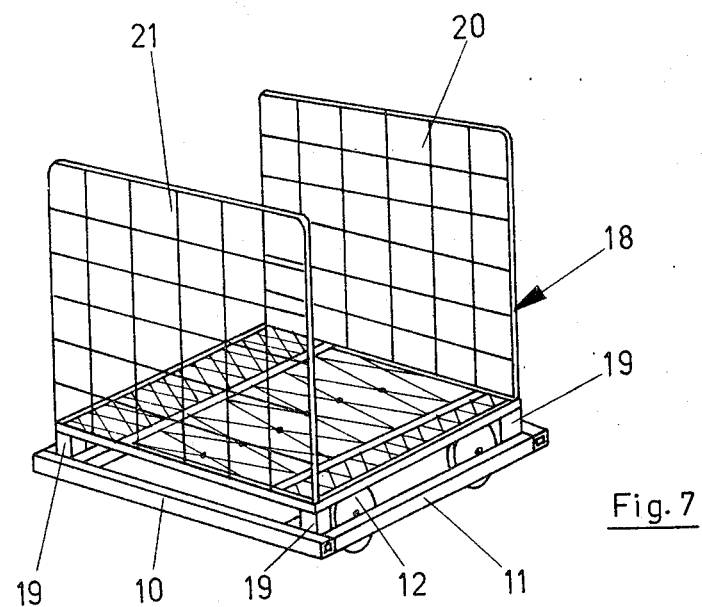
FIGS. 7 to 10 illustrate further embodiments of storage and transport units.

In FIG. 7, a further embodiment of a storage and transport unit is illustrated, which comprises a trolley according to FIG. 3, upon which a meshed cage 18 is open to the top and, on two sides, is supported. The cage is supported, by means of four feet 19, on the trolley. These feet 19 may, for instance, be welded on the cage 18, whilst their free ends are inserted in the trolley in the vicinity of its four corners. The free rotatability of the wheels 12 must obviously be taken into consideration for the proper dimensioning of the height of the feet 19. The storage and transport unit thus formed is suitable for the accommodation of small light articles, which can be stacked and need to be prevented from falling, which is effected by the two side walls 20 and 21 of the cage 18. The cage 18 can also be equipped with intermediate members and then serves as a carriage with shelves.

Figure 8:
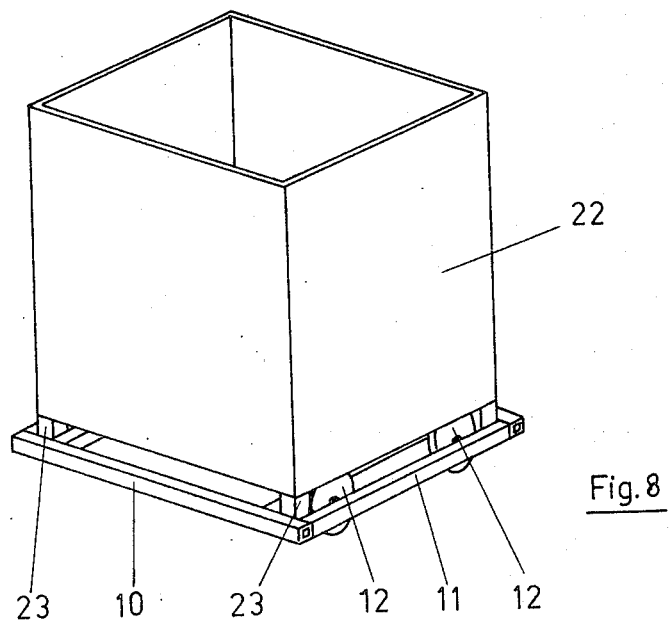

For small articles which cannot be stacked or for substances which can be poured, a storage and transport unit according to FIG. 8 can advantageously be utilised. This comprises a trolley according to FIG. 3 and a load receiving part 22, which is constructed as an open topped case made of wood, light metal or the like. Connection to the trolley is again effected by means of four feet 23, which are screwed or welded onto the part 22 and can be inserted in the trolley.

Figure 9:
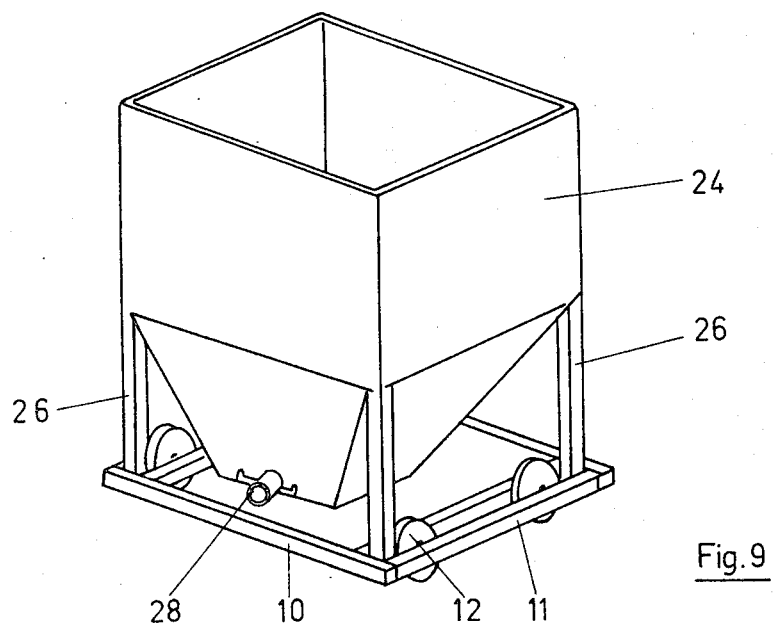
Figure 10:
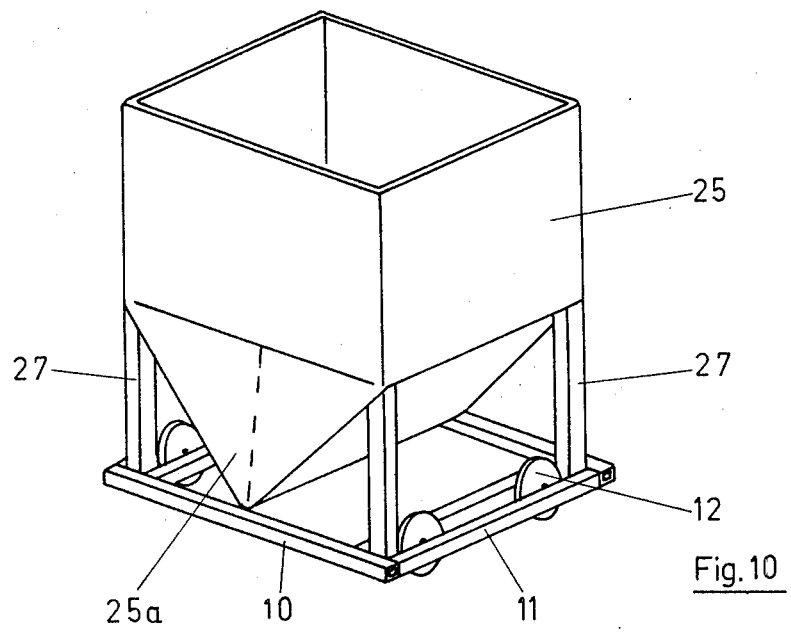

The embodiments illustrated in FIGS. 9 and 10 of the storage and transport unit are intended for the accommodation of finely granulated substances, which are capable of being poured, or of liquids. The load receiving part is formed by a container 24 or 25, whilst the trolley corresponds to the embodiment illustrated in FIG. 3.

The connection between the load receiving part and the trolley is effected by four feet 26 or 27, which are mounted on the container 24 or 25 and are inserted in the trolley in the vicinity of its four corners. The container 24, shown in FIG. 9, is particularly intended for the accommodation of fluids and comprises an outlet cock 28, whilst the container 25, shown in FIG. 10, is intended for finely granulated substances, capable of being poured. Its lower part 25a may have a hinged construction, in order to facilitate easy and rapid emptying operations.

Many different embodiments of load receiving parts are of course possible and these can ideally be combined with the trolley according to FIG. 3. The embodiments discussed merely represent some typical examples.

The trolley is identical in all the embodiments of the storage and transport unit, so that easy exchangebilty of the load receiving parts is thus ensured. All the mechanical and possibly electrical or optical auxiliary mechanisms co-operate only with the trolley. During the storage in the shelf, the storage and transport unit is disposed with the wheels 12 of the trolley on the bars 5 and is, moreover guided at the wheels. The brake mechanisms 7 also act upon the wheels 12 of the trolley, while the positioning and stop mechansim 6 co-operates with the frontal transverse member 10 of the trolley. Suitable auxiliary members such as stop bolts, arresting or holding cams or the like, which co-operate with corresponding members of the stop mechanism 6, may be mounted on this transverse member 10. The transfer mechanism 9 also acts only on the frame of the trolley. If a counter or control is provided for the position of the storage and transport unit, the trolley may actuate corresponding auxiliary members, if required.

All these features provide possibilities, so far unknown, for uniform standardization in the construction of storage systems in accordance with the invention. Regardless of the type of goods to be stored, the same storage system can be utilised in every case, that is to say, the same shelves, the same transport and conveying mechanisms and the same auxiliary mechanisms. It is clear that this standardisation of a plurality of elements of this storage system makes an enormous swing possible. Furthermore, complete compatibility with the standard trays, which have been introduced and are widely used, is attained, which represents a substantial advantage when changing an existing storage system to this new system, but all the standard trays which are generally available in large numbers, can be further utilised. No demands are made regarding the condition of these old trays which are already available, since they have the function of receiving the load and do not form part of all the further processes within the storage system.

This means, in other words, that, on mechanisation of the system, size tolerances, the occurence of abrasion and the like does not need to be taken into consideration, since all the mechanisms of the system come into contact only with the trolley of the storage and transport unit.

Subsequent change of position with reference to the goods to be stored, more particularly their dimensions, can also be effected in a most simple manner, since only the load receiving parts of the storage and transport units need to be exchanged. However, these have no function other than receiving the load, so that the storage system itself remains unaffected by changes. This fact is of particular importance, because worldwide changes to the tray standards are anticipated, which will be protracted over years. The advantageous selection features of the storage system, that is to say, adaptation to the goods to be stored on one hand and, on the other, to the mechanical apparata of the system, is also reflected in higher speeds for changing position of the stored goods, which enables low operational costs of the system to be maintained.

What is claimed is:

1. In a shelf storage and transportation system for goods on pallets having rollers on a base for the pallets which are supported on a plurality of shelves in a stand and having a stop means at the end of a shelf to act only on the conveyer vehicle, that improvement consisting of:
   a rectangular frame formed of vertical members connected to each other by horizontally extending transverse members to form shelves;
   a pair of longitudinal trackway members, one on each side of said frame, and supported on said transverse members;
   one end of each said trackway members being higher than the other end to form a gradient in the direction of the receiving end of the shelf;
   a stop and positioning mechanism at the receiving end of said shelf on said trackway members to stop and position pallets on said trackway;
   braking means mounted on said trackway members to regulate the speed of pallets rolling on said trackway member;
   a mobile conveyer vehicle fitted with a transfer mechanism for loading and unloading said shelves, said conveyer vehicle fitted with four wheels within opposite sides of a four sided frame for supporting said pallet as a unit on a slip resistant supporting part of said frame;
   wheel casings at said opposite sides of said frame to rotatably support said wheel at a small distance of about 1 to 2 centimeters above the lower contacting surface of said wheels whereby the bottom of the pallet is close to said trackway members;
   means for changing the position of the mobile conveyer vehicle and pallet unit within the system comprising two sets of supports disposed at opposite sides respectively of the frame, both parts having their axes of rotation disposed above the frame the first part being said four sided frame; and,
   the second part of said means being adapted to be interchangeably supported on said first part and formed to receive the goods to be transported or stored.

2. A system as claimed in claim 1, in which the second part comprises a plate and a plurality of feet extending from one side of said plate which rest on the first part at their free ends.

3. A system as claimed in claim 1, in which the second part is said unit pallet.

4. A system as claimed in claim 1, in which the second part is an open topped meshed wire cage, which is open on two opposite sides and is equipped with a plurality of feet extending from the lower surface of the cage and resting on the first part at their free ends.

5. A system as claimed in claim 1, in which the second part is formed by an open square container having feet extending from its lower surface, and resting on the first part at their free ends.

6. A system as claimed in claim 1, in which the second part is a tank, having a drainage aperture at the lower end and equipped with feet resting on the first part at their free ends.

* * * * *